Oct. 28, 1924.
C. V. SWANSON
1,513,652
CONNECTING ROD AND SHAFT ROLLER BEARING
Filed March 21, 1924
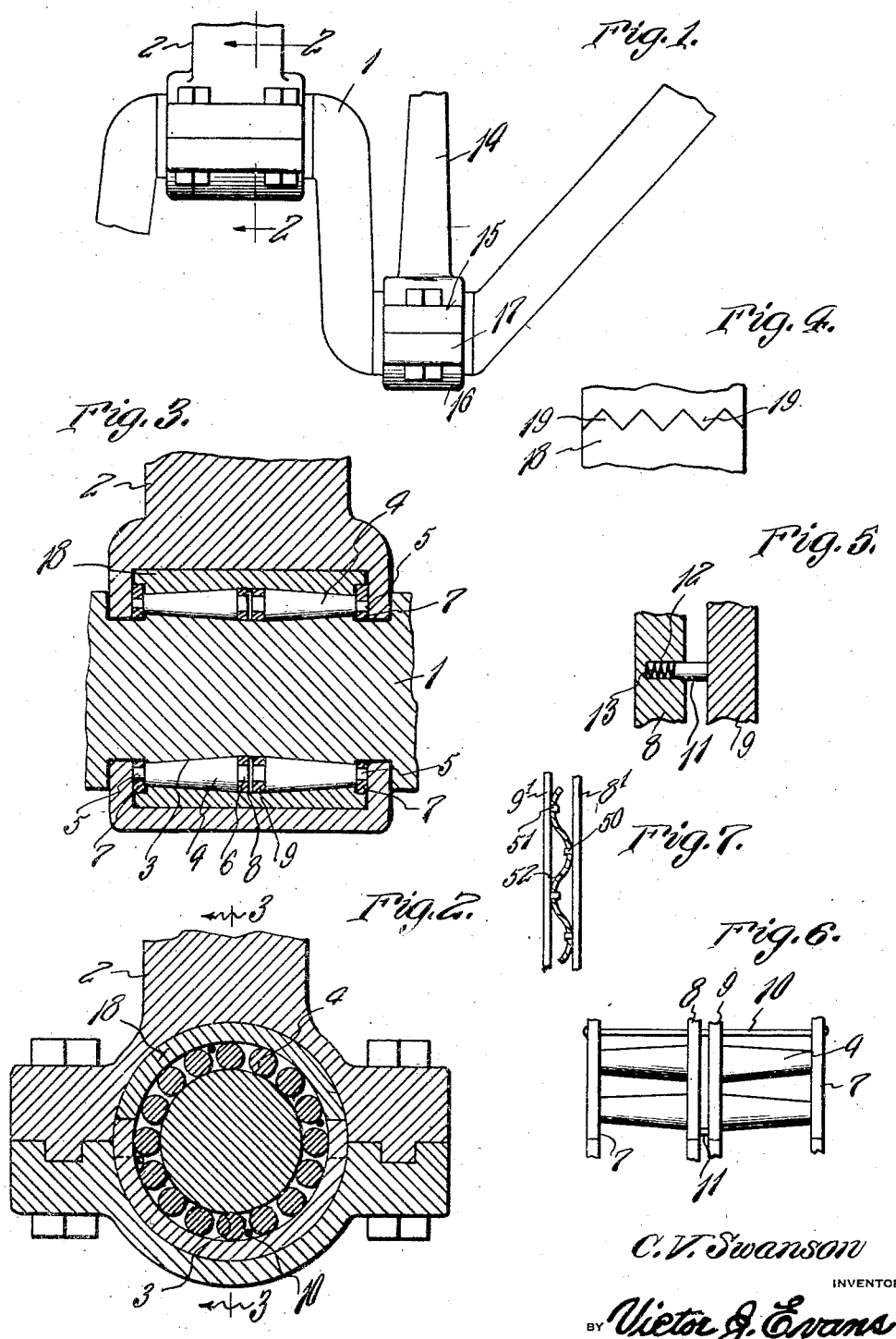

Patented Oct. 28, 1924.

1,513,652

UNITED STATES PATENT OFFICE.

CHARLES V. SWANSON, OF MONTROSE, SOUTH DAKOTA.

CONNECTING-ROD AND SHAFT ROLLER BEARING.

Application filed March 21, 1924. Serial No. 700,863.

*To all whom it may concern:*

Be it known that I, CHARLES V. SWANSON, a citizen of the United States, residing at Montrose, in the county of McCook and State of South Dakota, have invented new and useful Improvements in Connecting-Rod and Shaft Roller Bearings, of which the following is a specification.

One of the main troubles in an automobile is the wear imparted on the bearings for the crank shaft and for the piston rods associated with the shaft. Generally these bearings are of Babbitt metal and because of the wear thereon require frequent replacement.

It is the object of this invention to provide an internal combustion engine construction with roller bearings for the crank shaft and for the piston rods associated therewith and in which such bearings are so caged as to automatically take up any wear that may occur therein, and consequently to produce a bearing in which friction is reduced to a minimum and which shall be long lived.

To the attainment of the foregoing, reference is to be had to the drawings which accompany and which form part of this application.

In the drawings:—

Figure 1 illustrates a sufficient portion of an internal combustion engine to disclose the application of my improvement.

Figure 2 is a sectional view approximately on the line 2—2 of Figure 1, on an enlarged scale.

Figure 3 is a sectional view approximately on the line 3—3 of Figure 2, showing the bearing removed from the crank shaft.

The remaining figures illustrate details.

As disclosed in Figure 1 of the drawings, my improvement is designed for use in connection with the main bearing of an engine crank shaft 1 and with the piston rods connected to the crank portion of the shaft. As all of the bearings are of a similar construction, a detailed description of one will be taken as equally applicable to the remainder.

The straight portions of the crank chaft 1 that find bearings in the engine frame 2 are formed with depressions. This is also true of the cranked portions of the shaft 1. The depressed portions of the shaft are flared inwardly from the ends to the central portions thereof. These depressions are indicated by the numeral 3. Designed for contacting engagement with the oppositely flared walls provided by the depressed portions of the shaft are cone-shaped rollers 4 arranged in opposite pairs. The rollers 4 have their ends reduced to provide trunnions 5 and 6 respectively. The trunnions 5 on the reduced ends of the rollers find bearings in the outer ring cages 7 of the improvement. The trunnions 6 likewise find bearings in annular depressions formed on the opposite or outer faces of the inner ring cage members 8 and 9 respectively. The outer rings 7 of the respective roller cages are, at suitable spaced intervals, connected by wire members 10, the said wire members passing loosely through the inner cage members 8 and 9. The ring cages 8 and 9 have on their confronting faces pins 11 and openings 12 to receive the pins therein. On each of the pins there is mounted a small but strong helical spring 13. The springs 13 exert a pressure against the inner cage ring members 8 and 9, forcing the same away from each other and likewise forcing the widened ends of the rollers 4 toward the outer ring cages. In this manner it will be noted that wear upon the rollers is automatically compensated for. The piston connecting rods are indicated by the numeral 14, each of which having its headed end of a semi-circular formation and provided with outstanding ears 15. The concaved heads are formed with depressions, the walls of which being flared inwardly, from the ends of the head to the center thereof so that the roller bearings will be snugly received in the head. The cap piece for the head, indicated by the numeral 16 is, of course, in the nature of a semi-cylindrical member, and has its inner face depressed to provide the same with a continuous bore whose walls are flared inwardly from the sides to the center thereof. Thus the cap members likewise snugly engage the rollers. The cap members 16 are provided at their ends with ears 17 that have their outer faces formed with lugs to be received in depressions in the ears 15. Securing means of the ordinary construction, that is, bolts engaged by nuts, pass through the ears 15 and 17 for holding the cap section 16 on the head of the piston rod. The parts of the engine frame in which the bearings at the straight ends of the crank shaft are received have head portions similar to the head portions of the piston connecting rods and caps or head sections therefor similar to the caps or head sections 16.

The bearings are received in and contact with a bearing ring 18. The ring, as disclosed in Figures 2 and 4 is made up of two members which have their confronting ends formed with teeth 19 and with V-shaped spaces between the teeth. The teeth 19 of one of the ring sections is designed to be received in the space between the V-shaped teeth of the cooperating ring section. The bore of the sectional ring is deepest at its center, gradually increasing in depth to its ends which, of course, is true with respect to the engine crank shaft and the bearing support therefor. It is, of course, to be understood that instead of constructing the rollers in cone-shaped formation the same may be round and of an equal thickness throughout their lengths.

In Figure 7 the confronting disks 8' and 9' for the oppositely arranged roller cages are each provided with spaced lugs 50 and 51 respectively. The lugs 50 on the disk 8' are disposed intermediate the lugs 51 on the disk 9'. These lugs pass centrally through openings in the bowed or corrugated portions of a ring spring member 52. The spring member, of course, forces the cage sections 8' and 9' away from each other, and the openings through which the lugs pass are sufficiently elongated to permit of the spreading or contracting of the spring. The guide rods also pass through the cage sections.

Having described the invention, I claim:—

1. An anti-frictional bearing comprising spaced series of cone-shaped rollers having their ends reduced to form trunnions, a cage for each series of rollers comprising ring members having bearings in which the reduced ends of the rollers are journaled, means connecting the outer cage sections and passing freely through the inner cage sections, spring means between the inner cage sections exerting an outward pressure thereagainst, and guide means between said cage sections for said spring means.

2. An anti-frictional bearing, comprising series of cone-shaped rollers which have their ends reduced to form trunnions, cages for the rollers comprising ring members having bearings in which the roller trunnions are journaled, means connecting the outer cage sections and passing freely through the inner cage sections, pins fixed on the confronting faces of the inner cage sections and received in openings therefor in the said cage sections, and a helical spring surrounding each pin and exerting an outward pressure against the inner cage sections.

In testimony whereof I affix my signature.

CHARLES V. SWANSON.